(12) United States Patent
Vandaele-Fenouil et al.

(10) Patent No.: US 12,544,243 B2
(45) Date of Patent: Feb. 10, 2026

(54) ENDOPROSTHESIS AND A METHOD OF PRODUCING AN ENDOPROSTHESIS

(71) Applicant: KARDIOZIS SAS, Aix-en-Provence (FR)

(72) Inventors: Nathalie Vandaele-Fenouil, Aix-en-Provence (FR); Barry Nugent, County Galway (IE)

(73) Assignee: KARDIOZIS SAS, Aix-en-Provence (FR)

( * ) Notice: Subject to any disclaimer, the term of this patent is extended or adjusted under 35 U.S.C. 154(b) by 674 days.

(21) Appl. No.: 17/761,751

(22) PCT Filed: Sep. 8, 2020

(86) PCT No.: PCT/EP2020/074991
§ 371 (c)(1),
(2) Date: Mar. 18, 2022

(87) PCT Pub. No.: WO2021/052803
PCT Pub. Date: Mar. 25, 2021

(65) Prior Publication Data
US 2022/0370216 A1 Nov. 24, 2022

(30) Foreign Application Priority Data
Sep. 19, 2019 (EP) .................................. 19315116

(51) Int. Cl.
*A61F 2/90* (2013.01)
(52) U.S. Cl.
CPC ........ *A61F 2/90* (2013.01); *A61F 2210/0076* (2013.01); *A61F 2220/005* (2013.01); *A61F 2240/001* (2013.01); *A61F 2250/0067* (2013.01); *A61F 2250/0069* (2013.01)

(58) Field of Classification Search
CPC ...... A61F 2/82; A61F 2/90; A61F 2/07; A61F 2002/823; A61F 2210/0076; A61F 2220/0075; A61F 2250/0069
See application file for complete search history.

(56) References Cited

U.S. PATENT DOCUMENTS

| 9,848,976 B2 | 12/2017 | Angel et al. | |
| 2006/0004442 A1* | 1/2006 | Spenser | A61F 2/2472 623/1.21 |
| 2006/0200230 A1* | 9/2006 | Richter | A61F 2/06 623/1.39 |

(Continued)

FOREIGN PATENT DOCUMENTS

| CN | 104114201 A | 10/2014 |
| WO | 2006/111801 A2 | 10/2006 |

(Continued)

OTHER PUBLICATIONS

International Search Report Corresponding to PCT/EP2020/074991 mailed Nov. 18, 2020.

(Continued)

*Primary Examiner* — Javier G Blanco
(74) *Attorney, Agent, or Firm* — Finch & Maloney PLLC

(57) ABSTRACT

An endoprosthesis having a body part, a first cover sheet, and a thrombogenic fiber. The fibers are attached to the endoprosthesis by a fixation layer and partially arranged between the first cover sheet and the fixation layer.

5 Claims, 3 Drawing Sheets

(56) References Cited

U.S. PATENT DOCUMENTS

Figure 1:
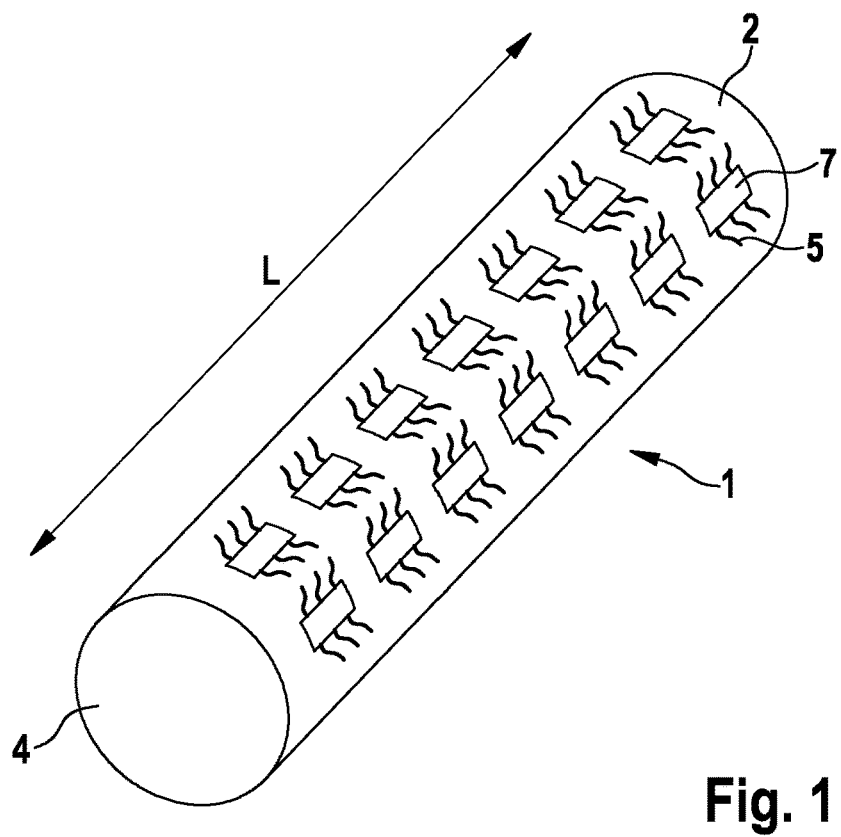

| | | | | |
|---|---|---|---|---|
| 2013/0144373 A1* | 6/2013 | Shahriari | ............... | A61F 2/962 623/1.13 |
| 2015/0148889 A1* | 5/2015 | Angel | ...................... | A61F 2/07 623/1.1 |
| 2019/0083226 A1* | 3/2019 | Baxter | ...................... | A61F 2/07 |

FOREIGN PATENT DOCUMENTS

| | | |
|---|---|---|
| WO | 2009/149294 Z1 | 12/2009 |
| WO | 2013/182614 A1 | 12/2013 |
| WO | 2019122944 A1 | 6/2019 |

OTHER PUBLICATIONS

Written Opinion Corresponding to PCT/EP2020/074991 mailed Nov. 18, 2020.
Indian Office Action corresponding to IN 202217013332 dispatched on Mar. 6, 2025.

\* cited by examiner

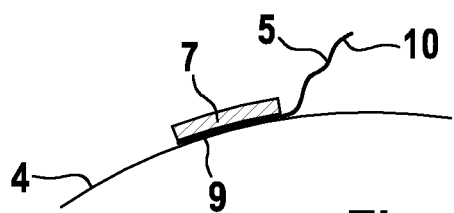
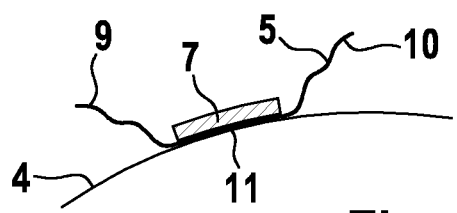
Fig. 4a
Fig. 4b
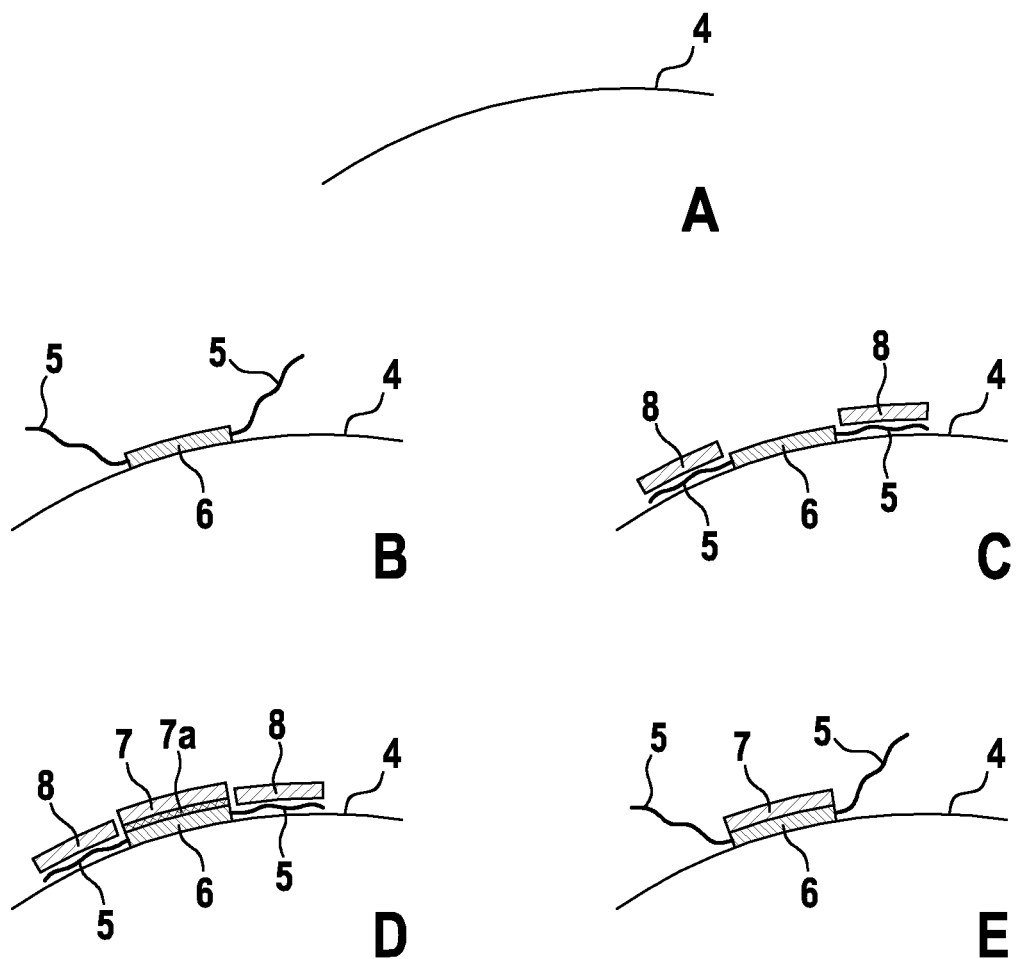
Fig. 5

ENDOPROSTHESIS AND A METHOD OF PRODUCING AN ENDOPROSTHESIS

The invention relates to an endoprosthesis and a method to produce an endoprosthesis, in particular a vascular or a heart stent, according to the preamble of the independent claims.

Endoprosthesis, in particular vascular and heart stents, are used to support blood vessels in the human body. For example, occlusions or aneurysms can be treated by placing such an endoprosthesis at the respective treatment site. In the treatment of an occlusion, the endoprosthesis keeps the vessel open for unhindered blood flow. In the case of an aneurysm, the endoprosthesis can prevent circulation of blood in the aneurysm and thus lower the risk of rupture or further growth of the aneurysm.

It is known in the prior art to use thrombogenic elements on endoprosthesis. For example, WO 2013/182614 A1 discloses an endoprosthesis with thrombogenic elements that extend away from a body of the endoprosthesis and promote thrombosis. This allows for the occlusion of an aneurysm to enhance the above-mentioned treatment effect.

However, currently known methods do not provide a simple way of post-production arrangement of thrombogenic elements on an endoprosthesis. Fixation and attachment of thrombogenic elements is usually cumbersome and difficult, and not typically versatile.

Thus, the object of the present invention is to overcome the drawbacks of the prior art, in particular to provide an endoprosthesis and a method to produce an endoprosthesis wherein thrombogenic elements can easily be added to a surface of the endoprosthesis, in particular in a versatile manner and at selected locations on the endoprosthesis surface.

This and other objects are achieved by the endoprosthesis and the methods according to the characterizing portion of the independent claims of the invention.

The endoprosthesis, in particular the vascular stent or the heart stent, according to the invention has a longitudinal axis and comprises at least one body part, and a first cover sheet. The body part preferably comprises a scaffold, in particular a scaffold arranged within the first cover sheet. Additionally, the endoprosthesis comprises at least one thrombogenic fiber. Furthermore, the endoprosthesis comprises at least one fixation layer which attaches, preferably permanently, the at least one thrombogenic fiber to the endoprosthesis. The at least one thrombogenic fiber and/or a support structure for the thrombogenic fiber is at least partially arranged between the fixation layer and the first cover sheet.

For example, a support structure for the at least one thrombogenic fiber may be a support strip to which the fiber is attached. If no support structure is used, at least a portion of the fiber is arranged in a sandwich-like structure between the fixation layer and the first cover sheet. If the at least one fiber is attached to a support structure, only the support structure may be arranged between the first cover sheet and the fixation layer. However, it is also possible to arrange both the at least one fiber and the support structure in that way, for example if the fixation layer extends over the support structure and covers the at least one fiber as well. Alternatively, the at least one fiber may be arranged above or below the support structure, the two of which are arranged between the fixation layer and the first cover sheet.

In a preferred embodiment, the at least one thrombogenic fiber has at least one part, in particular a free end, extending from the fixation layer and the first cover sheet. For example, the fixation layer may cover a segment of the fiber, but not cover another segment of it.

In another preferred embodiment, the endoprosthesis comprises at least one support strip and the at least one thrombogenic fiber is attached to the at least one support strip. The attachment of the at least one fiber may include knitting, threading, stitching and/or gluing. The separate attachment of the fibers to a support strip in particular enables easy production of preassembled parts and ultimately easier production of the endoprosthesis.

In particular, the support strip may be arranged between the first cover sheet and the at least one fixation layer.

In particularly preferred embodiment, at least one of the support strip and the fixation layer comprises an adhesive. The adhesive enables easy attachment of the support structure to the the first cover sheet of the endoprosthesis.

In particular, the support strip and/or the fixation layer may comprise a hot melt adhesive that, in its molten state, has a contact angle on polytetrafluoroethylene (PTFE) of less than 45°, preferably less than 30°. Additionally or alternatively, the adhesive may also be adapted to be curable by electromagnetic radiation, in particular UV light, heat, or oxygen.

Most preferably, the adhesive is adapted such as to, in particular in its molten state, penetrate at least one of the first cover sheet and the fixation layer. In particular, the contact angle of the adhesive in a liquid state (prior to a hardening, annealing, or drying step) on the first cover sheet material is adapted such that it can fill percolating pores in the first cover sheet.

Preferably, the adhesive is provided as an adhesive layer on the fixation layer. For example, the adhesive may be provided as a layer of poly urethane on a fixation layer.

In another preferred embodiment, at least one of the first cover sheet and the at least one fixation layer comprise PTFE, in particular a plurality of electrospun fibers of PTFE.

In a preferred embodiment, the first cover sheet and the at least one fixation layer consist of the same material.

In preferred embodiment, the endoprosthesis comprises at least one protection strip which is releasably attached to the endoprosthesis. In its attached state, the protection strip retains the at least one thrombogenic fiber on a surface of the first cover sheet.

In a particularly preferred embodiment, the scaffold comprises a metallic material, in particular a shape memory metal, preferably an alloy comprising nickel and/or titanium.

In a preferred embodiment, the endoprosthesis comprises at least two body parts. The at least two body parts may, for example, be adapted to treat different parts of a vessel with different diameters. Such endoprosthesis with more than one body part are disclosed in WO 2013/182614 A1.

In another preferred embodiment, the total thickness of the endoprosthesis wall can typically be less than 120 µm and/or greater than 115 µm.

In a preferred embodiment, a first and a second end portion of the at least one thrombogenic fiber extends from the fixation layer and the first cover sheet.

In an alternative embodiment, a first end portion of the at least one thrombogenic fiber is arranged between the fixation layer and the first cover sheet. A second end portion of the at least one thrombogenic fiber extends from the fixation layer the first cover sheet.

In yet another preferred embodiment, at least one of the fixation layers is arranged such that a first and a second end portion of the at least one thrombogenic fiber extends from the fixation layer the first cover sheet.

In yet another preferred embodiment, a first end portion of at least one of the thrombogenic fibers is arranged between the fixation layer and the first cover sheet. A second end portion of said at least one of the thrombogenic fibers extends from the fixation layer the first cover sheet.

In a preferred embodiment, the endoprosthesis comprises at least two fixation layers. The at least two fixation layers are separated by a space along the surface of the first cover sheet.

In a preferred embodiment, the at least one fixation layer has an elongated shape running in a direction parallel to the longitudinal axis of the endoprosthesis.

The invention further relates to a method of producing an endoprosthesis, in particular an endoprosthesis as described herein.

The method according to the invention comprises, in a first step, providing an endoprosthesis frame having a first cover sheet. In other steps, a thrombogenic fiber and a fixation layer are provided. The thrombogenic fiber is arranged on the first cover sheet. The thrombogenic fiber is attached on the first cover sheet by fixing the fixation layer on the first cover sheet, wherein, preferably, the at least one thrombogenic fiber is arranged at least partially between the fixation layer the first cover sheet.

In preferred embodiment, the method further comprises providing a mandrel which is provided with a first cover sheet and a scaffold. In particular, the scaffold may be arranged in the first cover sheet.

In a preferred embodiment, at least one support strip, with the at least one thrombogenic fiber attached thereto, is provided.

In a preferred embodiment, the at least one of the at least one support strip and the at least one fixation layer comprises an adhesive, preferably a hot melt adhesive. The step of fixing the fixation layer comprises an activation of the adhesive, preferably melting of the hot melt adhesive. Alternatively, the activation of the adhesive may also comprise exposure to electromagnetic radiation, in particular UV light, heat, or oxygen.

In a preferred embodiment, the method further comprises the step of providing at least one protection strip which is releasably attached to the endoprosthesis. In its attached state, the protection strip retains the at least one thrombogenic fiber on a surface of the first cover sheet.

In a preferred embodiment, the step of providing a first cover sheet comprises coating with a plurality of electrospun fibers.

In a preferred embodiment, the step of providing a fixation layer comprises coating with a plurality of electrospun fibers. Alternatively, the fixation layer may also be provided as a pre-cut patch comprising a plurality of electron-spun fibers. Preferably, such pre-cut patch comprises an adhesive layer.

In particular, the electrospun fibers comprise, preferably consist of, PTFE.

The endoprosthesis and the method described herein are particularly suited to be combined with the endoprosthesis disclosed in WO 2013/182614 A1, the content of which is incorporated by reference.

In the following, the invention is described in detail with reference to the following figures:

FIG. 1: shows schematically an endoprosthesis according to the invention

Figure 2A:
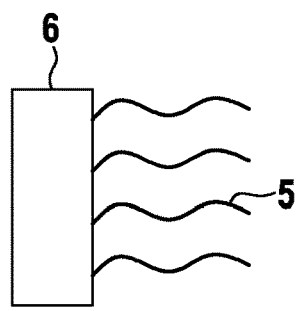
Figure 2B:
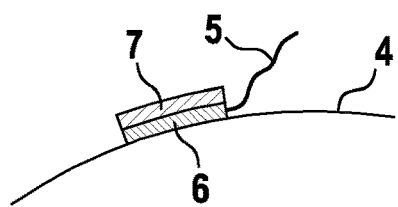
Figure 3A:
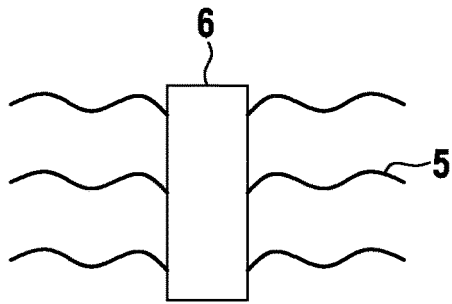
Figure 3B:
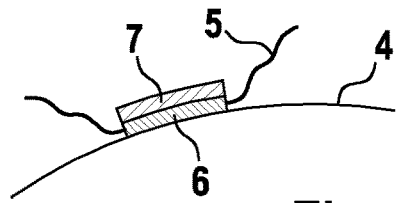
Figure 6:
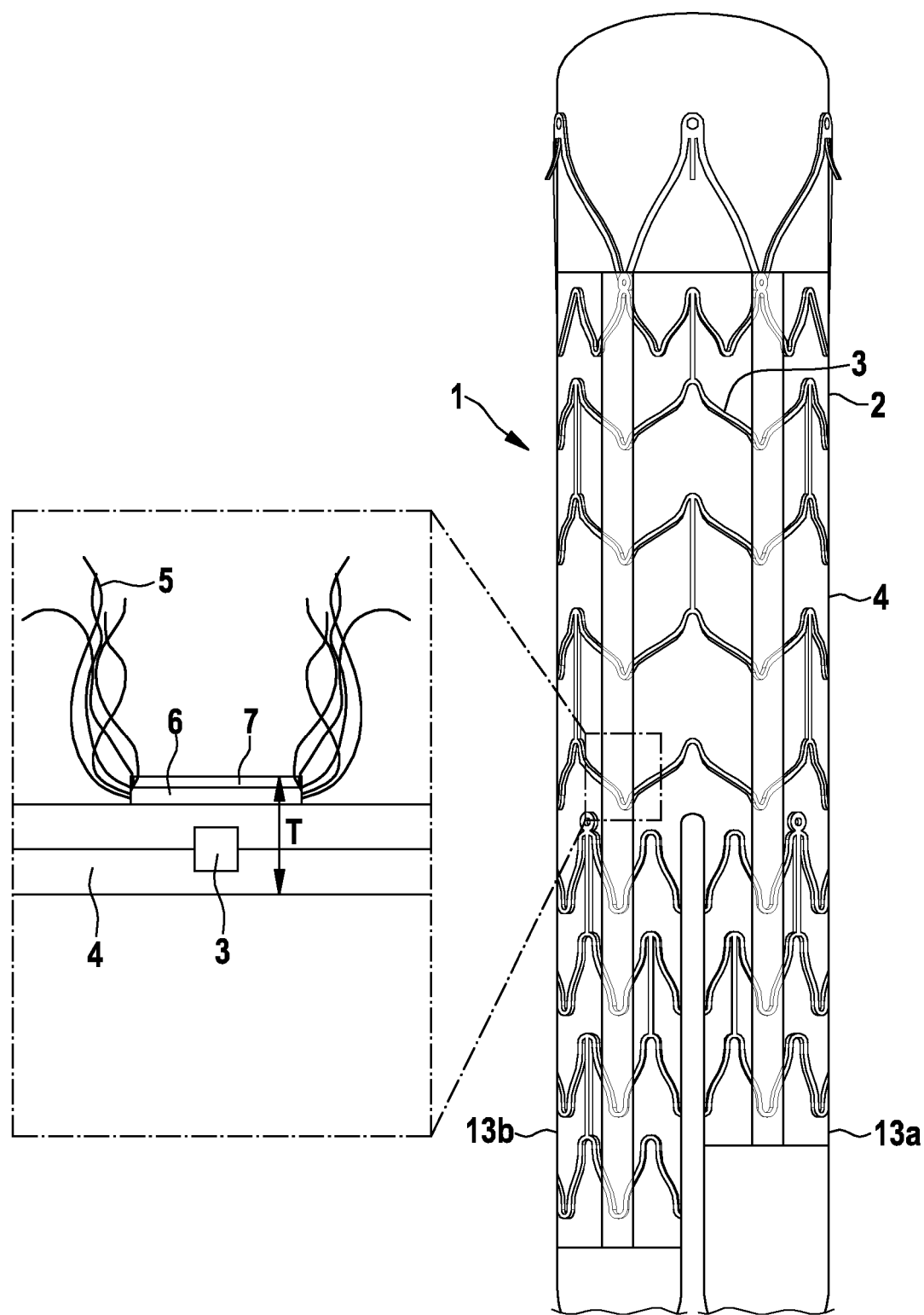

FIG. 2a-2b: show a top view of a support strip and a side view when attached to an endoprosthesis FIG. 3a-3b: show a top view of another support strip and a side view when attached to an endoprosthesis FIG. 4: show different embodiments of fiber attachments FIG. 5: schematically shows the method according to the invention FIG. 6: shows a detailed illustration of an endoprosthesis FIG. 1 shows an endoprosthesis 1 according to the invention comprising a body part 2 and a first cover sheet 4. A plurality of fibers 5 is attached to the first cover sheet 4 by means of a support strip (not shown) and a fixation strip 7. The support strips and the fixation layers exhibit an elongated shape and are running in the direction of the longitudinal axis L of the endoprosthesis 1.

FIG. 2a shows a support strip 6 with a plurality of fibers 5 attacked thereto. The support strip comprises a polyurethane as an adhesive composition. In this particular embodiment, the support strip has an elongated shape and the fibers are only extending on one side of the support strip.

FIG. 2b shows the support strip 6 of FIG. 2a in a crossectional side view when fixed on the first surface 4 with a fixation layer 7. Because the fibers 5 are only attached on one side of the support strip 6, the fibers 5 only extend on one side of the fixation layer 7 as well.

FIG. 3a shows an alternative embodiment of a support strip 6. This support strip 6 exhibits an elongated shape with fibers 5 extending from both sides.

FIG. 3b shows the support strip 6 of FIG. 3a when fixed on the first cover sheet 4 by means of a fixation layer 7. The fibers 5 extend from the fixation layer 7 on both sides, corresponding to the fiber arrangement of the support strip.

FIG. 4a shows an embodiment of the endoprosthesis in a side view. In this particular embodiment, no support strip is used. Instead, the fiber 5 is arranged directly on the first cover sheet 4. The fixation layer is arranged over a first end portion 9 of the fiber 5, whereas a second end portion 10 of the fiber 5 extends from the fixation layer 7.

FIG. 4b shows an alternative embodiment of the endoprosthesis. In this particular embodiment, no support strip is used. Instead, the fiber 5 is arranged directly on the first cover sheet 4. A middle portion 11 of the fiber 5 is arranged between the first cover sheet 4 and the fixation layer 7. The first and second end portions 9, 10 of the fiber 5 extend away from the fixation layer.

FIG. 5 schematically shows the steps of the method according to the invention. In a first step (A), an endoprosthesis is provided. For simplicity, only the first cover sheet 4 is shown. Here, the first cover sheet consists of electrospun PTFE fibers. In another step (B), a support strip 6 that has fibers 5 attached to it on both sides is provided and arranged on the first cover sheet 4. Another step (C) comprises arranging protection strips 8 on the first cover sheet 4 and the fibers 5. The fibers 5 are retained close to the surface of the first cover sheet 4 and completely covered by the protection strips 8. The support strip 6 is not covered by the protection strips 8. In a next step (D), the endoprosthesis is provided with the fixation layer (7). Here, the fixation layer 7 consists of a pre-cut patch of electrospun PTFE fibers with an adhesive layer 7a of polyurethane. The fixation layer 7 is arranged on the support strip 6. The side of the fixation layer 7 with the adhesive layer 7a is oriented towards the support strip 6 and the first cover sheet 4. Finally (E), the protection strips 8 are removed. This releases the fibers 5 that now extend freely from the support strip 6 and the fixation layer 7. At this point, a heating and pressing step is used to press the fixation layer 7 towards the first cover sheet 4 and partially melt the adhesive layer of the fixation layer 7, which penetrates into the support strip 6, the first cover sheet 4, and the fixation layer 7, leading to enhanced fixation.

Because of the melting and penetration of other layers, the adhesive layer 7a is no longer visible after this step.

FIG. 6 shows a particular embodiment of the endoprosthesis. This illustration corresponds to step E in FIG. 5. Here, the endoprosthesis frame comprises a metallic scaffold 3 that is arranged within the first cover sheet 4. In this particular embodiment, the endoprosthesis has several body elements 2, 13a, 13b, wherein two body elements 13a, 13b have a smaller diameter than another body part 2. The endoprosthesis 1 exhibits a Y-shape. The scaffold 3 consists of an interconnected grid made of a Nitinol shape memory metal. It is encapsulated by electrospun PTFE fibers that make up the first cover sheet. The fibers 5 are provided on a support strip 6 that is arranged on the first cover sheet 4. After the coating with another layer of electrospun PTFE fibers and the removal of the protection strips (not shown here), the support strip 6 is encapsulated in a sandwich-like structure in between the first cover sheet 4 and the fixation layer 7. The total thickness T of the endoprosthesis wall, comprising the first cover sheet 4, the scaffold 3, the support strip 6, and the fixation layer 7 is between 115 and 120 µm.

The invention claimed is:

1. A stent-graft having a longitudinal axis, comprising:
   a tubular stent;
   a tubular graft attached to the tubular stent;
   at least two discrete support strips attached to an outer surface of the tubular graft, wherein each of the at least two discrete support strips have an elongated shape running in a direction parallel to the longitudinal axis of the stent graft;
   a plurality of thrombogenic fibers attached to each of the at least two discrete support strips; and
   at least two discrete fixation strips attaching the plurality of thrombogenic fibers to the stent-graft, wherein each of the at least two discrete fixation strips have an elongated shape complementary to the shape of the at least two discrete support strips;
   wherein each of the at least two discrete support strips are arranged between the tubular graft and a respective one of the at least two discrete fixation strips;
   wherein a first end portion of the plurality of thrombogenic fibers is arranged between a respective one of the at least two discrete fixation strips and the tubular graft and a second end portion of the plurality of thrombogenic fibers radially extends from the respective one of the at least two discrete fixation strips and the tubular graft to a free end.

2. The stent-graft according to claim 1, wherein the at least two fixation strips include an adhesive provided as an adhesive layer.

3. The stent-graft according to claim 2, wherein the adhesive is adapted such as to penetrate at least one of the tubular graft and the at least two fixation strips.

4. The stent-graft according to claim 1, wherein at least one of the tubular graft and the at least two fixation strips comprise polytetrafluoroethylene (PTFE).

5. The stent-graft according to claim 1, wherein the tubular graft and the at least two fixation strips consist of the same material.

* * * * *